(12) United States Patent
Khadim (10) Patent No.: US 6,202,688 B1
(45) Date of Patent: Mar. 20, 2001

(54) INSTANT-ON VENTED TANK VALVE WITH MANUAL OVERRIDE AND METHOD OF OPERATION THEREOF

(75) Inventor: Neil M. Khadim, Kitchener (CA)

(73) Assignee: GFI Control Systems Inc. (CA)

( * ) Notice: Subject to any disclaimer, the term of this patent is extended or adjusted under 35 U.S.C. 154(b) by 0 days.

(21) Appl. No.: 08/845,775

(22) Filed: Apr. 28, 1997

Related U.S. Application Data (60) Provisional application No. 60/016,573, filed on Apr. 30, 1996.

(51) Int. Cl.[7] .................................................. F16K 11/20
(52) U.S. Cl. .................................. 137/599.08; 137/625.5
(58) Field of Search ................................ 137/625.5, 599, 137/613, 599.08, 599.13, 599.14; 251/30.04, 35, 39; 123/529

(56) References Cited

U.S. PATENT DOCUMENTS

| | | | |
|---|---|---|---|
| 1,438,983 | * 12/1922 | Collin . | |
| 1,616,706 | * 2/1927 | Taber | 137/599 |
| 1,625,796 | * 4/1927 | Denison | 137/599 |
| 1,833,981 | * 12/1931 | Wagner | 251/39 |
| 2,775,259 | * 12/1956 | Stiebel . | |
| 2,968,464 | * 1/1961 | Olson | 251/30.04 |
| 3,405,906 | 10/1968 | Keller | 251/30 |
| 3,651,794 | * 3/1972 | Douglas | 123/529 |
| 3,710,770 | * 1/1973 | Newkirk | 123/529 |
| 3,885,589 | * 5/1975 | Iung | 137/613 |
| 4,176,687 | * 12/1979 | Ensign | 137/625.5 |
| 4,215,714 | * 8/1980 | Laue | 137/625.5 |
| 4,304,264 | 12/1981 | McClintock et al. | 137/630.13 |
| 4,354,571 | 10/1982 | Lakin et al. | 180/271 |
| 4,526,340 | 7/1985 | Kolchinsky et al. | 251/38 |
| 4,679,765 | 7/1987 | Kramer et al. | 251/38 |
| 4,699,351 | 10/1987 | Wells | 251/29 |
| 4,709,728 | * 12/1987 | Ying-Chung | 137/599 |
| 4,779,837 | * 10/1988 | Mito | 251/30.04 |
| 5,263,679 | 11/1993 | Bushnell | 251/28 |
| 5,301,920 | 4/1994 | Ichiki | 251/30.04 |
| 5,341,844 | 8/1994 | Wass et al. | 137/613 |
| 5,474,104 | * 12/1995 | Borland | 137/599 |

FOREIGN PATENT DOCUMENTS

| | | | |
|---|---|---|---|
| 395672 | * 12/1965 | (CH) | 251/30.04 |
| 814978 | * 7/1949 | (DE) | 251/39 |
| 3322-844 | * 12/1983 | (DE) | 251/30.04 |
| 0753695 A1 | 1/1997 | (EP) . | |
| 901783 | * 8/1945 | (FR) | 251/30.04 |
| 1064732 | 4/1967 | (GB) . | |
| 593039 | * 2/1978 | (RU) | 251/30.04 |
| WO 95/06835 | 3/1995 | (WO) . | |

* cited by examiner

Primary Examiner—Stephen M. Hepperle
(74) Attorney, Agent, or Firm—Fitzpatrick, Cella, Harper & Scinto (57) ABSTRACT

An instant-on valve assembly with manual override is designed to be connected to a tank containing high pressure gaseous fuel. The valve assembly and manual override allows the tank to be alternately closed off, vented or allows the gas in the tank to bypass the instant-on valve. The instant-on valve assembly can be repaired or replaced without venting the tank. The instant-on valve assembly has a main valve and a bleed valve The main valve has a secondary plunger that opens and closes a main orifice. The bleed valve has a bleed valve stem that opens and closes a bleed orifice. The main valve is slidably mounted within a housing and has a chamber at one end and a zone at another end. Both the zone and the chamber have access to high pressure gaseous fuel within the tank. High pressure gaseous fluid within the zone can be drained when the bleed valve stem is fully open. The bleed valve stem is connected to a solenoid and opens upon activation of the solenoid. When the pressure within the zone is sufficiently reduced, the pressure within the chamber will cause the main valve to open by sliding into the zone. A spring moves the main valve towards a closed position when the solenoid is deactivated. Since the volume of the zone is relatively small, the main valve opens within one second after the solenoid is activated.

7 Claims, 9 Drawing Sheets

INSTANT-ON VENTED TANK VALVE WITH MANUAL OVERRIDE AND METHOD OF OPERATION THEREOF

This application claims benefit of Provisional Application No. 60/016,573 filed Apr. 30, 1996.

BACKGROUND OF THE INVENTION

1. Field of the Invention

This invention relates to gas valves for use in vehicles powered by natural gas or other gaseous fuels and to a method of operation thereof. Such valves are connected to high pressure tanks that are utilized to open and close a passageway along which high pressure gaseous fuel flows from the tank to an engine of the vehicle in which the system is installed.

2. Description of the Prior Art

It is known to have gas valves installed on high pressure tanks in motor vehicles. Some previous valves are described in U.S. Pat. Nos. 5,193,580; 5,197,710; and 5,341,844 issued to Wass, et al. Since the solenoid on previous valves must overcome the high tank pressure, previous designs utilize a two-stage process in which a small "bleed" orifice is opened initially, the "bleed" orifice being connected to the downstream gas outlet passageway. With time, the pressure in the outlet passageway gradually builds up so that the pressure differential between the tank and the outlet passageway is greatly reduced. Ultimately, the pressure differential is small enough that the solenoid is able to unseat the main valve, thus allowing the high pressure gas from the tank to have full access to the outlet gas passageway.

Tank pressures are typically in the range of 3600 psi and can rise to much higher values under adverse conditions and a typical diameter for inlet and outlet passageways is around one-third of an inch or larger. It is not unusual therefore to require a force of 300 to 400 pounds to be exerted in order to unseat the valve and, allow gas from the tank full access to the outlet passageway.

Some previous valves are mounted internally and, when the valve malfunctions, it is extremely difficult to make repairs, to vent the tank or to remove the gas pressure from the valve by shutting off the flow of gas from the tank to the valve. Further, if the valve fails, with some previous designs, the motor vehicle cannot be operated. Still further, with previous valves, there is a relatively large time lapse from the turning of the key until the starting of the engine as it can take the valve eighteen seconds or longer to fully open.

SUMMARY OF THE INVENTION

It is an object of the present invention to provide an "instant-on" solenoid operated valve assembly with a manual override where an instant-on valve can move from the fully closed position to the fully open position in a fraction of a second, said valve can be easily repaired without having to remove said valve from the tank if it fails, the pressure can be easily relieved in a controlled manner from said valve if said valve fails, the tank can be easily vented if said valve fails or the instant-on valve can be bypassed to operate the engine. It is a further object of the present invention to provide an instant-on tank valve assembly with manual override wherein the main valve opens within one second after a solenoid is activated to open a bleed valve.

An instant-on vented tank valve assembly with manual override for connection to a tank containing high pressure gaseous fuel, said valve comprising in combination:

(a) an inlet passageway and an outlet passageway;

(b) an instant-on valve assembly has a bleed valve and a main valve. The main valve has a secondary piston mounted to open and close a main orifice. The bleed valve has a bleed valve stem mounted to move relative to said secondary piston to open and close a bleed orifice, said main orifice and said bleed orifice providing access to said outlet passageway. An outer portion of said secondary piston is mounted in a zone that has an open access to said tank through said inlet passageway when both of said valves are closed so that said zone has a pressure substantially equal to a pressure of said high pressure gaseous fluid within said tank. The zone is isolated from said access to said tank when said bleed valve opens by a sufficient amount, the zone has a drain to drain pressure from said zone when said zone is isolated from said access. The secondary piston has an inner portion that is mounted in a chamber. The chamber is accessible to said high pressure gaseous fluid in said tank, said main valve opening when said pressure on said inner portion from said chamber is sufficiently greater than a pressure on said outer portion from said zone. The bleed valve is connected to open when a solenoid is activated, said main valve closing when said solenoid is deactivated. The secondary piston is biased toward a closed position by a force external to said secondary piston. The zone has open access to gaseous fluid within said tank when said bleed valve is closed. The main valve closes when said pressure in said zone on said outer portion is sufficiently greater than a pressure on said inner portion;

(c) said manual override is connected to alternately close off said tank or vent said tank if said instant-on valve assembly is not operating properly.

An instant-on ventilated tank valve assembly with manual override for connection to a tank containing high pressure gaseous fuel comprises in combination:

(a) a main valve, said main valve having a secondary piston slidably mounted within a housing to open and close a main orifice. The piston has a zone located at one end thereof and a chamber located at another end thereof. The secondary piston slides into said zone to open said main orifice. Said zone has an interruptable access to high pressure gaseous fuel, said chamber being accessible to high pressure gaseous fuel. There are means to interrupt said access to said gaseous fuel and means to drain gaseous fuel from said zone when said bleed valve is sufficiently open. The main valve opens when a pressure within said chamber sufficiently exceeds a pressure within said zone by said secondary piston sliding into said zone;

(b) said manual override being connected to alternately close off said tank or vent said tank if said instant-on valve assembly is not operating properly.

A method of operating an instant-on valve assembly with manual override connected to a tank containing high pressure gaseous fuel, said method comprising setting the manual override in a neutral position and operating said instant-on valve assembly, when said instant-on valve assembly fails, moving the manual valve from said neutral position to one of a closed position or a venting position, thereby closing off a supply of fuel from said tank or venting said fuel from said tank respectively.

A method of operating an instant-on valve with manual override, said method comprising setting the manual override in a neutral position and operating the instant-on valve, if the instant-on valve fails, moving the manual valve from the neutral position to one of a closed position, a bypass position and a venting position.

DESCRIPTION OF A PREFERRED EMBODIMENT

Figure 1:
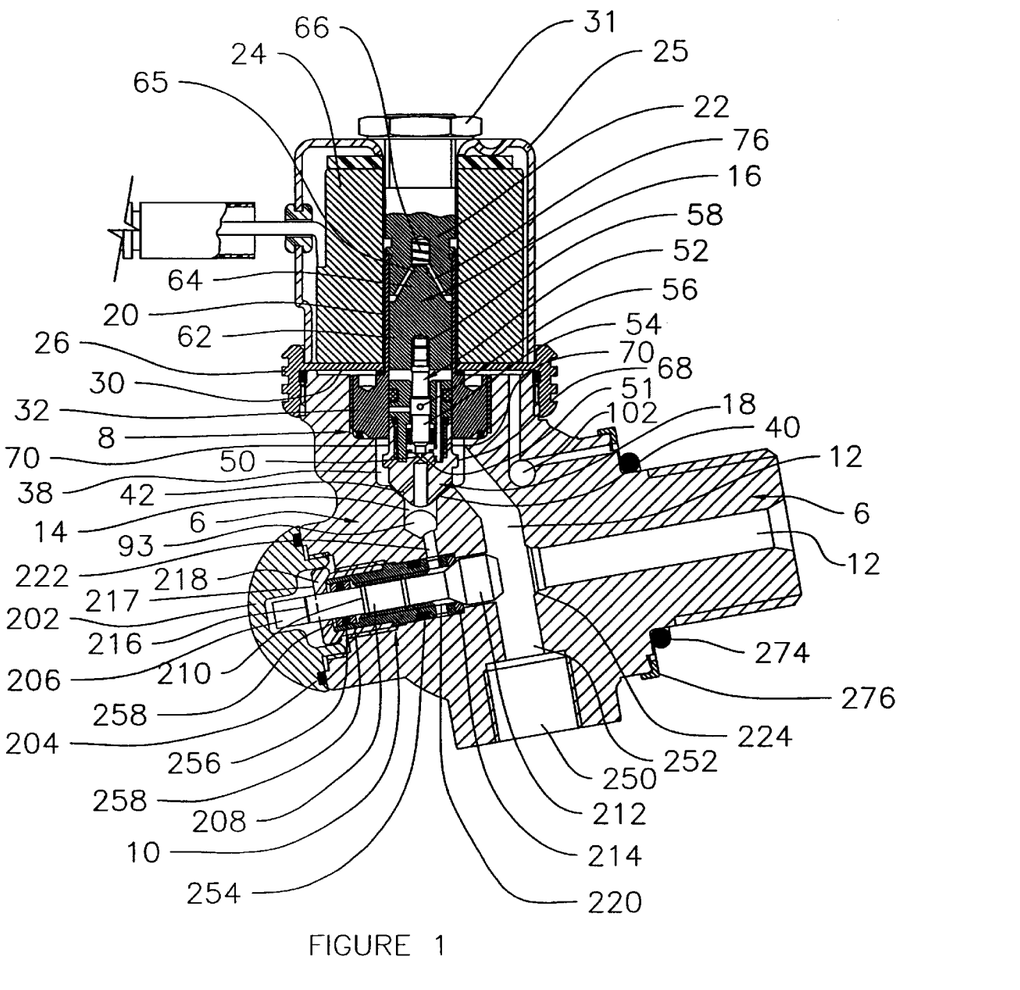
FIG. 1 is a partial sectional side view of the valve and override of the present invention.
Figure 2:
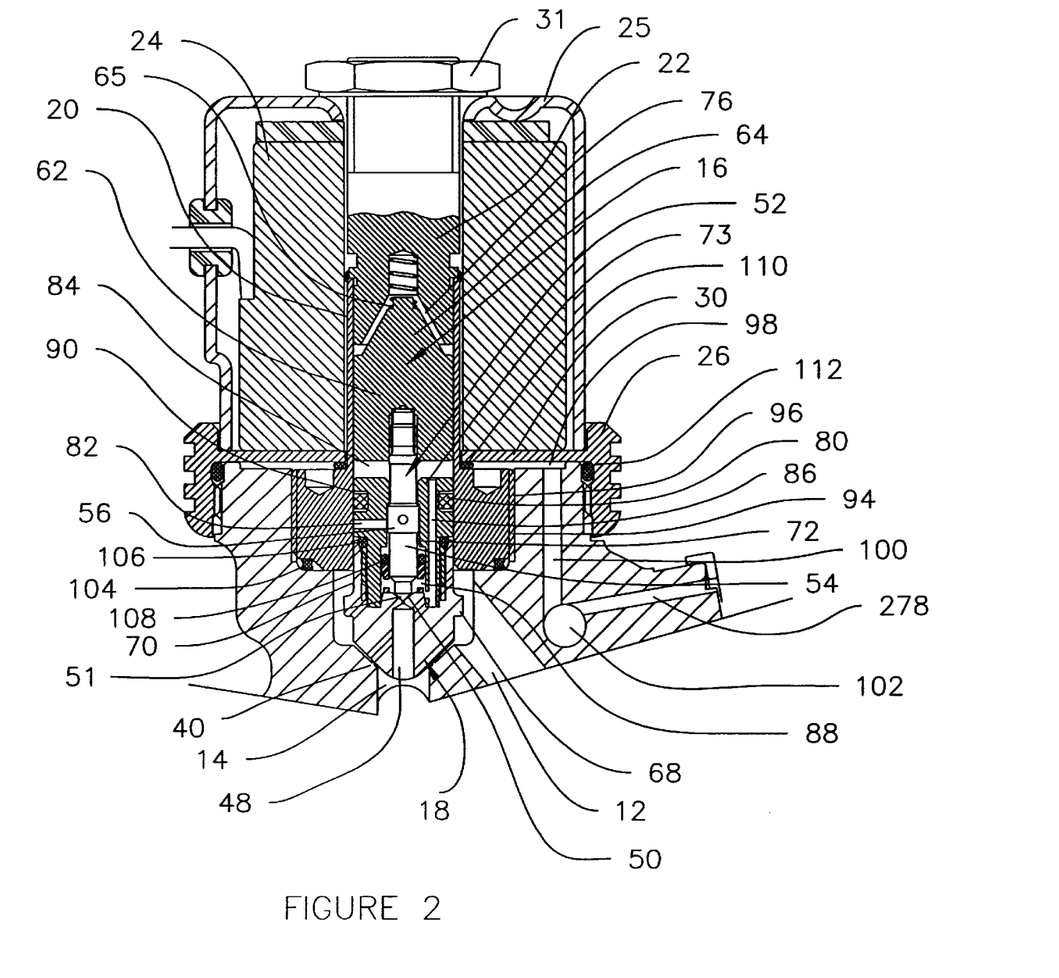
FIG. 2 is an enlarged sectional side view of an instant-on valve of FIG. 1.
Figure 3:
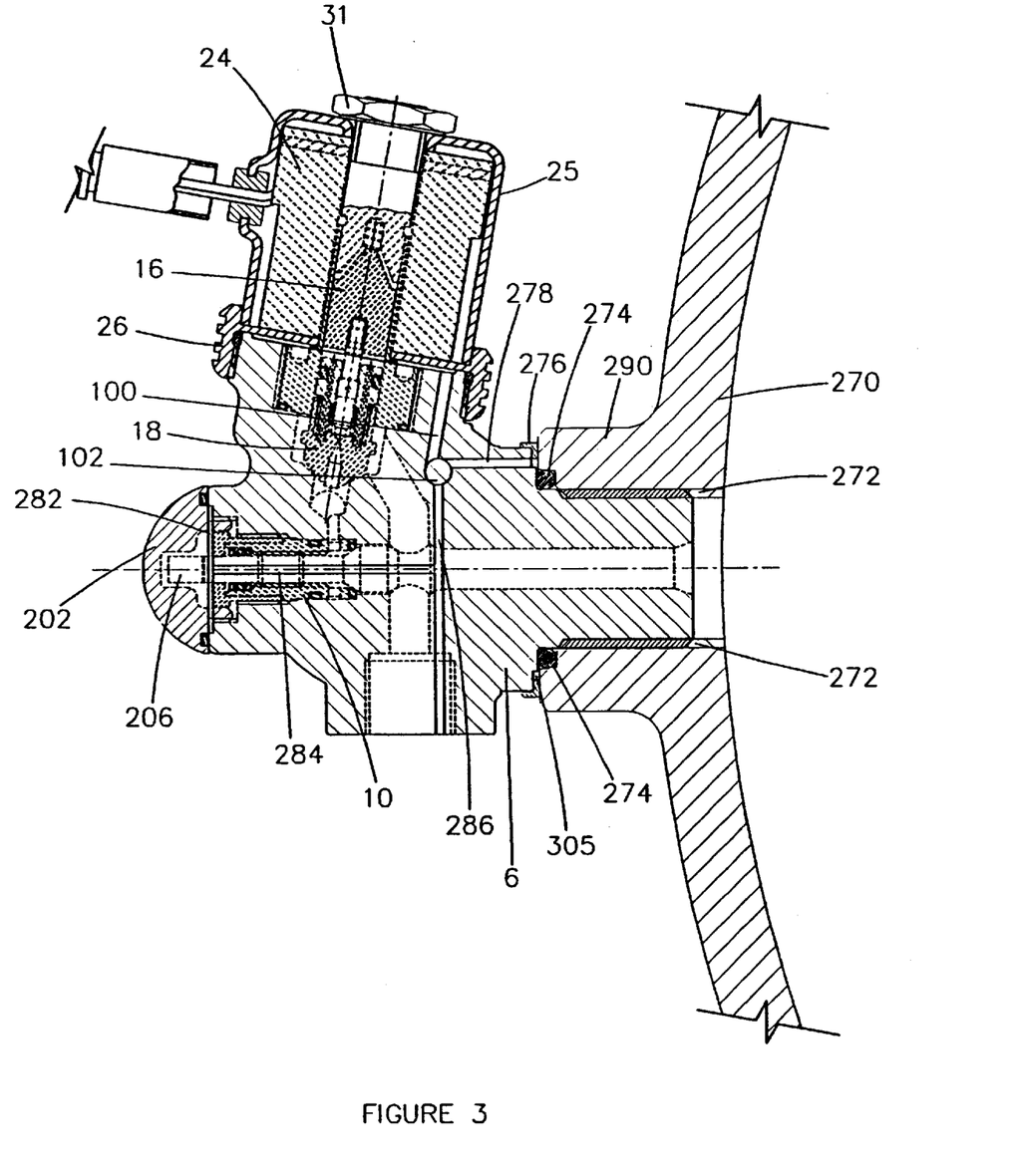
FIG. 3 is a partial sectional view of the valve of FIG. 1 mounted on a tank.

In FIGS. 1, 2 and 3 there is shown a main valve body 6 in section having an instant-on valve 8 and a manual override 10. Drilled into the main body 6 are an inlet passageway 12 and an outlet passageway 14. The drawing illustrates a primary plunger 16 and a secondary piston 18 which are slidably connected to one another in a manner to be described below and which are slidable within a sleeve 20 secured to a stop block 22, with a solenoid coil 24 of conventional construction being mounted about the combination of the sleeve 20 and the stop block 22. The solenoid coil 24 is located within a cover 25. Immediately below the solenoid coil 24 and firmly supporting the same, is a collar 26 having an internal thread which engages a suitable external thread on the main body 6 and which has an integral flange 30 extending inwardly to a location adjacent the sleeve 20. A nut 31 holds the cover 25 in the position shown in the drawing. The material of the collar 26 is ferromagnetic, with the result that the flux lines of the magnetic field created by the solenoid coil 24 pass only through bodies having a portion lying to the solenoid coil side of the flange 30. In the condition shown in FIG. 1, the magnetic flux lines engage only the primary plunger 16 because the secondary piston lies entirely beyond the plane of the flange 30 on a side opposite to the solenoid coil.

The sleeve 20 has a base 32 located in a machined out recess (not shown) of the main body 6. The base has external threads (not shown) that mesh with internal threads (not shown) of the main valve body 6.

Also machined into the main body 6 is a further cylindrical recess 38 which is coaxial with the outlet passageway 14 and defines a frusto-conical valve seat 40, also coaxial with the outlet passageway 14.

The secondary piston 18 has a closure portion 42 which closes the outlet passageway 14 when the secondary piston 18 is in its lowermost position. The closure portion 42 of the secondary piston also can support a ring seal (not shown) which would form an effective seal against the frusto-conical valve seat 40. The secondary piston is slidably mounted within a housing and moves outward to open and inward to close.

Along a central longitudinal axis of the closure portion 42 is a cylindrical coaxial passageway 48, which necks down at an inner end thereof to form a "bleed" orifice. The "bleed" orifice communicates with a frusto-conical valve seat 50, which may be closed or opened by a conical free end 51 of a valve stem 52. The free end 51 is connected to an elongated cylindrical member 54 having a centrally located enlarged collar 56 thereon. An end 58 (opposite to the free end 51) is preferably threaded coaxially into a suitable opening in the primary plunger 16. The valve stem 52 is received by a cylindrical portion 62 of the primary plunger 16. The bleed valve moves outward relative to said secondary piston to open and inward relative to said secondary piston to close. A conical frustum 64 of the primary plunger 16 is located on the outer end of the cylindrical portion 62 and has a cylindrical gallery 65 at its peak, adapted to receive one end of a compression coil spring 66. The spring 66 provides the force external to the secondary piston.

Returning now to the secondary piston 18, it can be seen to have an outwardly projecting flange 68, which has a loose tolerance within the cylindrical recess 38 and a generally cylindrical portion 70 in the vicinity of the valve stem 52.

The cylindrical portion 70 has firstly a two-stage internal concentric bore 72, including two sections which have respective diameters slightly greater than respective outside diameters of the cylindrical portion 54 and the collar 56 of the valve stem 52. When the valve stem 52 is in a closed position against the seat 51, the collar 56 is spaced away from a reduced section 73 of the bore 72. Due to the deliberate provision of the loose tolerance between the cylindrical portion 70 and the base 32 of the sleeve 20, high pressure gaseous fuel can find its way into a space 76 between the primary plunger 16 and the stop block 22. This takes place as follows:

Firstly, the high pressure gas entering along the inlet passage 12 has direct access to the cylindrical recess 38. Due to the loose tolerance between the cylindrical portion 70 and the base 32 of the sleeve 20, the high pressure gas enters this annular space but cannot proceed past O-ring 80. The gas passes from the annular space just described to the bore 72 through passageway 82 and along the outer edges of the valve stem 52 through the bore 72 to annular chamber 84 located between the primary plunger 16 and the secondary piston 18. The high pressure gas can travel through the bore 72 to the annular chamber 84 as the collar 56 is spaced apart from the reduced section 73.

Once the gas reaches the annular chamber 84, it passes along the outside surface of the cylindrical portion 62 of the primary plunger 16 (which also has a loose tolerance with respect to the sleeve 20) and fills the space 76 up to a pressure substantially equal to the tank pressure. Gas from the annular chamber 84 passes through eccentric but axially aligned bores 86 to reach a central cylindrical chamber 88 surrounding a free end 51 of the valve stem 52.

Figure 14:
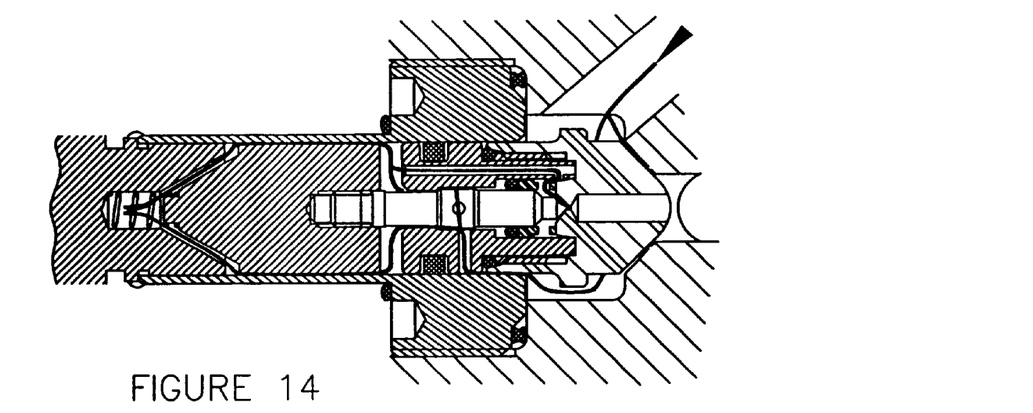
FIG. 14 is a partial section of an instant-on valve of the present invention showing the flowpaths through the instant-on valve when the instant-on valve is closed.

What has been described thus far is an instant-on valve of the invention in the "static" or closed position when the solenoid coil 24 is not energized and the vehicle (not shown) is at rest with the key (not shown) in the "off" position, (see FIG. 14).

When the solenoid coil 24 is energized (preferably, by turning the key [not shown] to the "on" position), the primary plunger 16 will be pulled toward the stop block 22 against the force of the coil spring 66. Since the gas pressure surrounding the primary plunger 16 at the moment that the solenoid coil 24 is energized is equal around the primary plunger, there will be little resistance to the movement of the plunger (except for the pressure exerted by the spring 66).

Figure 15:
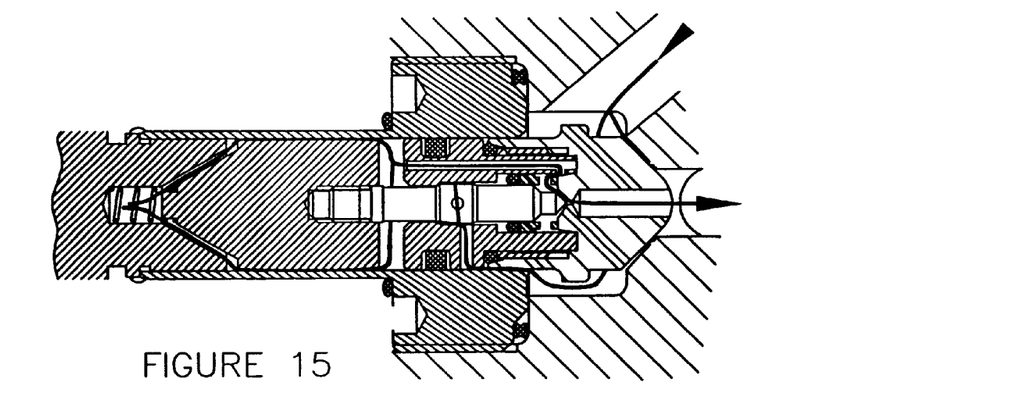
FIG. 15 is a partial section of an instant-on valve of the present invention showing the flowpaths through the instant-on valve when the first stage of the instant-on valve is open.

As soon as the primary plunger 16 starts to move toward the stop block 22, the valve stem 52 will move along with the primary plunger to open the small "bleed" orifice in the passageway 48 of the secondary piston 18. High pressure gas immediately passes through the "bleed" orifice through the passageway 48 and into the outlet passageway 14, (see FIG. 15). The entry of gas into the passageway 14 plays no part in the control of the instant-on valve 8.

Figure 16:
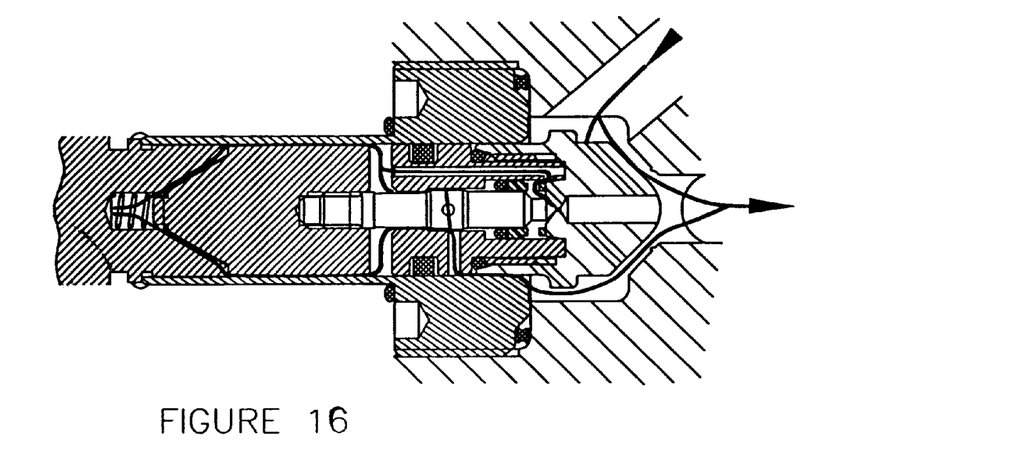
FIG. 16 is a partial section of an instant-on valve of the present invention showing the flowpaths through the instant-on valve when the second stage of the instant-on valve is open.

The primary plunger continues to move toward the stop block 22 until the collar 56 is seated against (not shown) the reduced section 73 of the bore 72 to close the bore 72 to the passage of gas, thereby preventing high pressure gas from continuing to enter the annular chamber 84. As a result, the high pressure gas in the space 76 and all around the outside of the primary plunger 16 passes downwardly through the bores 86, through the "bleed" orifice and ultimately through the passageway 48 to the outlet passageway 14. The O-ring 80 is mounted in an annular gallery 90 in the cylindrical portion 70 of the secondary plunger 18. As stated previously, the O-ring 80 prevents high pressure gas from passing along the outside of the cylindrical portion 70 past the O-ring 80. The sealing effect of the O-ring 80 defines a differential pressure plane. As the high pressure gas from the area of the primary plunger 16 drains through the bores 86, the downward pressure on the secondary piston 18 quickly drops and a point is reached where the force lifting upwardly on the O-ring 80 (from the high pressure gas located in the annular space between the cylindrical portion 70 and the base 32) and the secondary piston 18 will exceed the downward force on the secondary piston 18 defined by the area of a circle having the diameter of the ring seal multiplied by the (quickly decreasing) pressure in the annular chamber 84. The space 76, chamber 84, annular space along an outer surface of the primary plunger 16 and outside part of the valve stem 52 to the collar 56 comprise a zone that is cut-off from gas in the tank when the collar 56 seats against the reduced section 73. Since the zone has a tiny volume, pressure within the zone can be reduced quickly. Preferably, the main valve opens in less than a second after the solenoid is activated. When this state is reached, the secondary piston 18 will separate from the valve seat 40, thereby permitting the flow of high pressure gas directly from the inlet passageway 12 to the outlet passageway 14, (see FIG. 16).

When the secondary piston 18 has moved toward the primary plunger 16 so that part of the cylindrical portion 70 extends beyond the flange 30, the cylindrical portion 70 will be partially within the magnetic flux path created by the solenoid coil 24 causing a further attraction between the primary plunger 16 and the secondary piston 18. This attraction tends to further lift the secondary piston 18 away from the valve seat 40. As long as the engine (not shown) of the motor vehicle (not shown) is running, the secondary piston 18 will remain fully open. When the secondary piston 18 is moved toward the primary plunger 16 a sufficient distance, the free end 51 of the valve stem 52 will come into contact with the valve seat 50 at the "bleed" orifice, thereby preventing further movement of the secondary piston 18 toward the primary plunger 16. This will again open the annular passageway between the collar 56 and the reduced section 73 of the bore 72. The pressure differential across the O-ring 80 will therefore be reduced and will gradually progress toward equilibrium as more gas from the tank passes through the passage 82 and ultimately into the annular chamber 84 and the space 76. When the free end 51 of the valve stem 52 contacts the "bleed" orifice, the passageway 48 will be closed.

At this stage, the primary plunger 16 will be in contact with the stop block 22 and the secondary piston 18 will be magnetically coupled to the primary plunger 16 and will remain in that position as long as the solenoid remains energized. The magnetic force is sufficient to resist the downward drag arising from the dynamic passage of the gaseous fuel between the passageways 12 and 14 and the force exerted by the spring 66.

When the solenoid is turned off (i.e. the key) (not shown) or engine (not shown) is turned off, the force in the spring 66 is sufficient to move the primary plunger 16 away from the stop block 22, thereby initiating movement of the secondary piston 18 toward the closed position shown in FIG. 1.

It will be seen that the opening of the main access to the outlet passageway 14 is in no sense dependent upon the pressure in the passageway 14 as described in previously known valves. The outlet passageway 14 can be vented to the atmosphere through vent 93 without adversely affecting the operation of the instant-on valve assembly.

The base 32 of the sleeve 20 has a screw thread on its outer surface (not shown) for receiving an annular body 94, which has a screw thread on its inner surface (not shown). Preferably, the sleeve 20 and base 32 are made from stainless steel and the annular body 94 is made from brass. Vents 96 located between the annular body 94 and the base 32 provide means to vent leaks to the atmosphere through passageways 98, 100, 102 in the event that any gas leaks past the O-ring 104.

O-ring 106 is a static seal between the threaded union of the secondary piston 18. The O-ring 106 prevents high pressure gas from bypassing the intended path through passageway 82 that accesses space 84 via annular clearance of the secondary piston 18. O-ring 108 is a dynamic seal that prevents high pressure gas from flowing from the passageway 82 along the valve stem 52 after the enlarged collar 56 and reduced section 73 are in closed contact with one another.

O-rings 110, 112 are secondary seals that prevent any leakage to an interior of the vehicle compartment should the high pressure O-ring 104 leak.

An instant-on valve assembly constructed in accordance with the structure described above was able to move from the fully closed position to the fully opened position within an interval of 58 milliseconds.

Figure 11:
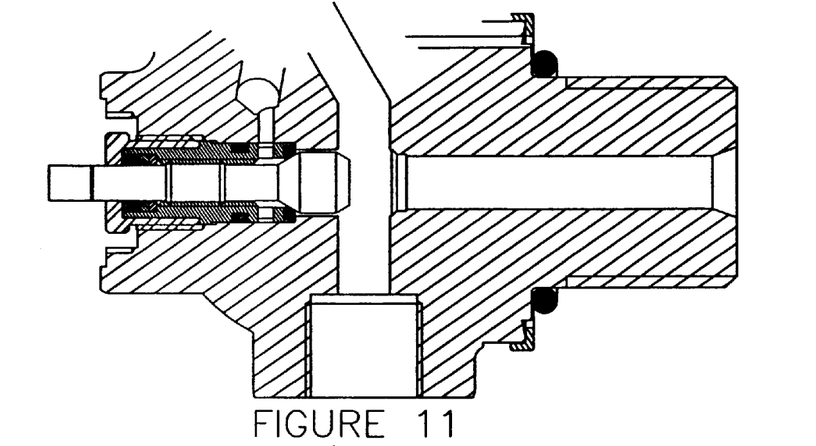
FIG. 11 is a partial sectional side view of the manual override of the present invention, showing the manual override in a fully open position.

In addition to the instant-on valve 8, the valve of the present invention has the manual override 10 which can be utilized in place of the instant-on valve 8 to vent the tank or to bypass the instant-on valve to run the engine (not shown) and operate the vehicle (not shown) or, further, to shut-off the gas supply completely to the instant-on valve and the engine. As described in FIG. 1, the manual override 10 has an end cap 202 which is sealed by an O-ring 204 to prevent or at least reduce leakage in the event that the manual override 10 leaks. To operate the manual override, the end cap 202 must be removed to expose a head 206. The head 206 is connected to an elongated valve spindle 208. The valve spindle has two annular projections 210 thereon. The annular projections fit within a corresponding screw thread so that the spindle 208 will move inward when turned clockwise (when viewed from the head 206) and will move outward when turned to counterclockwise. In (FIGS. 1 and 11) the manual override 10 is shown in the fully open position. In the fully open position, an enlarged inner end 212 is almost completely removed from the inlet passage 12 from the tank (not shown in FIG. 1), thereby allowing gas from the tank to flow to the instant-on valve 8. In the fully open position, the enlarged end 212 rests against an O-ring 214 so that pressurized gas will not leak into an interior of the manual override 10.

Figure 12:
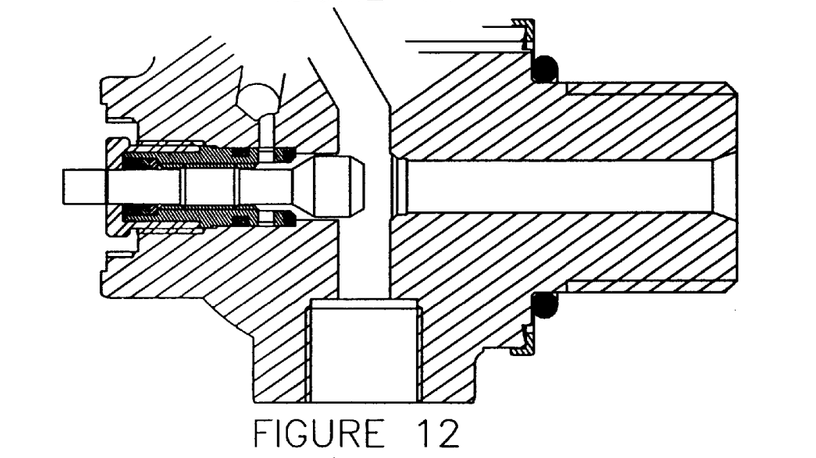
FIG. 12 is a partial sectional side view of the manual override of the present invention, showing the manual override in a by-pass position.

When the manual override 10 is turned clockwise so that it is partially closed (i.e. with a line 216 near the head 206 aligned with an outer surfce 217 of the housing 218), the manual override 10 is in a bypass position. In the bypass position, when the instant-on (a source of gas, such as a tank (not shown)) valve is not functioning and is in a closed position, high pressure gas can flow from the tank (not shown in FIG. 1) along the passageway 12 around the enlarged end 212 and into an interior 220 of the manual override 10 (see FIG. 12). From the interior 220, the high pressure gas flows along a bypass passageway 222 into the inlet passageway 14 to the engine (not shown). In this manner, the engine can be operated even though the instant-on tank valve is inoperable. It should be noted that the size of the bypass passageway 222 is much smaller than the passageway 12 and the outlet passageway 14 so that a reduced amount of gas will flow through the passageway 222 in the bypass mode.

Figure 13:
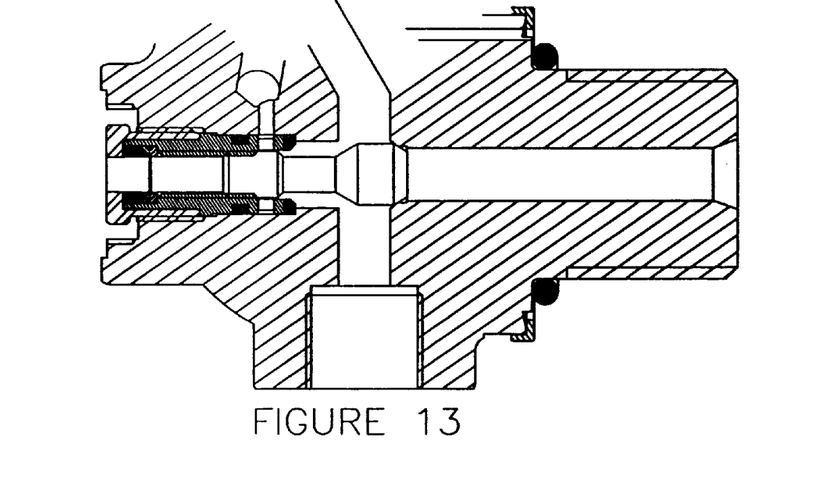
FIG. 13 is a partial sectional side view of the manual override of the present invention, showing the manual override in a shut-off position.

When the head 206 is turned clockwise still further, the enlarged end 212 will seat against seat 224 of the inlet passageway 12 to completely shut-off the flow of high pressure gas from a source of gas, such as; tank (not shown) through the inlet passageway 12 (see FIG. 13).

In the bypass position, the manual override can be used to vent the tank instead of running the engine (not shown) of the motor vehicle (not shown).

In the fully open position shown in FIG. 1, the manual override 10 can be used to vent the tank through a pressure relief valve (not shown) in recess 250 which is connected to inlet passageway 12 through passageway 252. O-ring 254 prevents leakage through the interior 220 of the housing 218. Similarly, O-ring 256 located between washers 258 prevents leakage from the interior 220 to the head 206. If the O-ring 256 does leak, then O-ring 204 prevents leakage through the end cap 202. As shown in FIG. 3, when high pressure gas from the tank 270 leaks along the outside of the valve body 6 through passageways 272, past O-ring 274, the gas is prevented from leaking out of the connection between the valve body 6 and the tank 270 by secondary seal 276. The gas leaks through passageway 278 to a vent 102 to the atmosphere. Similarly, when gas leaks into an interior of the end cap 202, it is vented through vents 282, 284 and 286 to the vent hole 102 and to the atmosphere.

In FIGS. 3, 4, 5 and 6, there is shown the tank 270 having an integral neck 290, which has internal threads 292. From FIGS. 5 and 6, it can be seen that the internal threads 292 are adapted to receive a threaded boss 304 extending integrally from the valve body 6.

Figure 4:
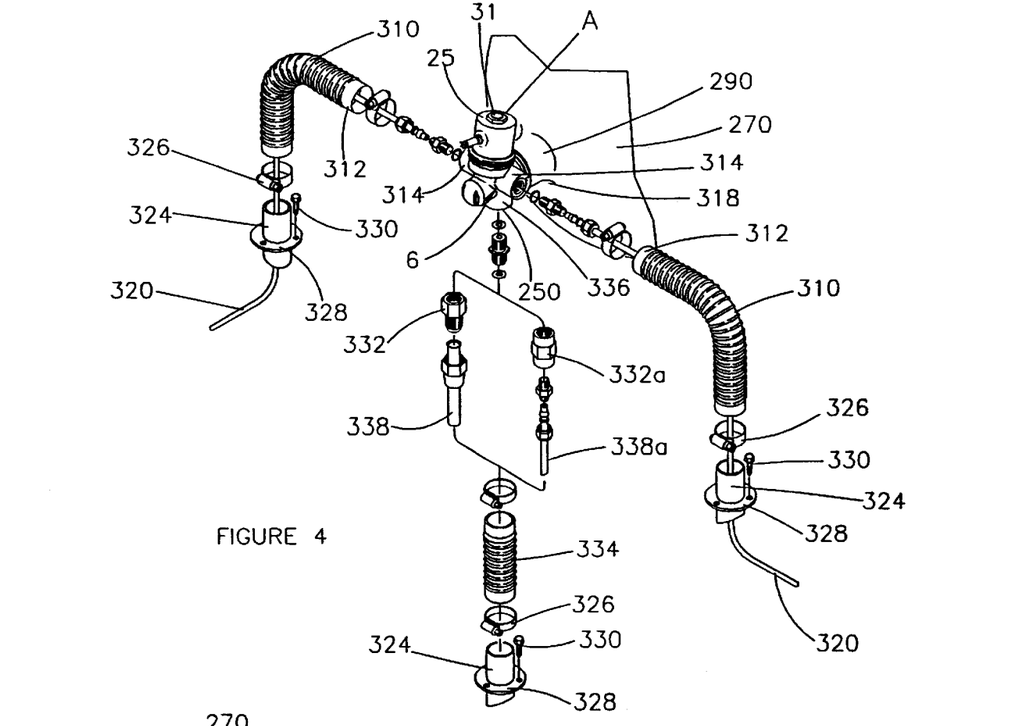
FIG. 4 is a partial, perspective, exploded view of a tank, a valve body and various hose and pressure line connections constituting the main components of a fuel supply system including the valve of the present invention.
Figure 5:
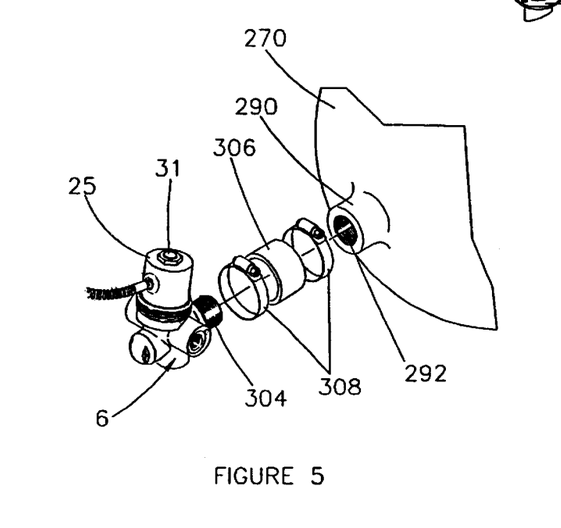
FIG. 5 is a partial, perspective, exploded view showing one mode of connection between the tank and the valve body.
Figure 6:
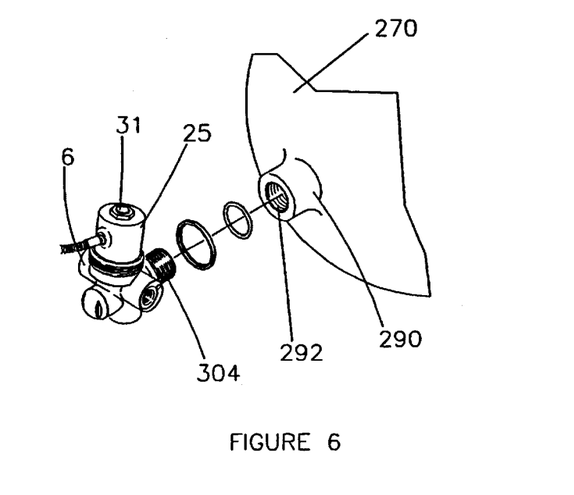
FIG. 6 is a partial, perspective, exploded view showing another mode of connection (as shown in FIG. 3) between the tank and the valve body.

In FIG. 5, the threaded boss 304 preferably has a tapered thread (sometimes called a "pipe thread"), and the internal threads 292 of the neck 290 are correspondingly tapered. It is known that a tapered thread connection becomes more and more impervious to leakage the more it is tightened, particularly when using sealing tape or the like. However, there always remains the risk of a thread abnormality or a crack in one of the two threaded members, which could allow high pressure gaseous fuel to escape. From FIG. 3, it can be seen that any such escaping gas would first enter the annular space 20 between the top wall of the neck 290 and the outward step defined by the valve body 6. The annular space just described, in accordance with this invention, is sealed by the provision of a sleeve 306 which is attached by means of adjustable clamps 308. In FIG. 6, the attachment of the valve body 6 to the tank 270 is the same as that shown in FIG. 5, except that the sleeve 306 and clamp 308 have been omitted. In FIG. 5, the tank is steel and in FIG. 6, the tank is aluminum. FIGS. 4, 5 and 6 show the cover 25 having the nut 31 on the valve body 6.

Figure 7:
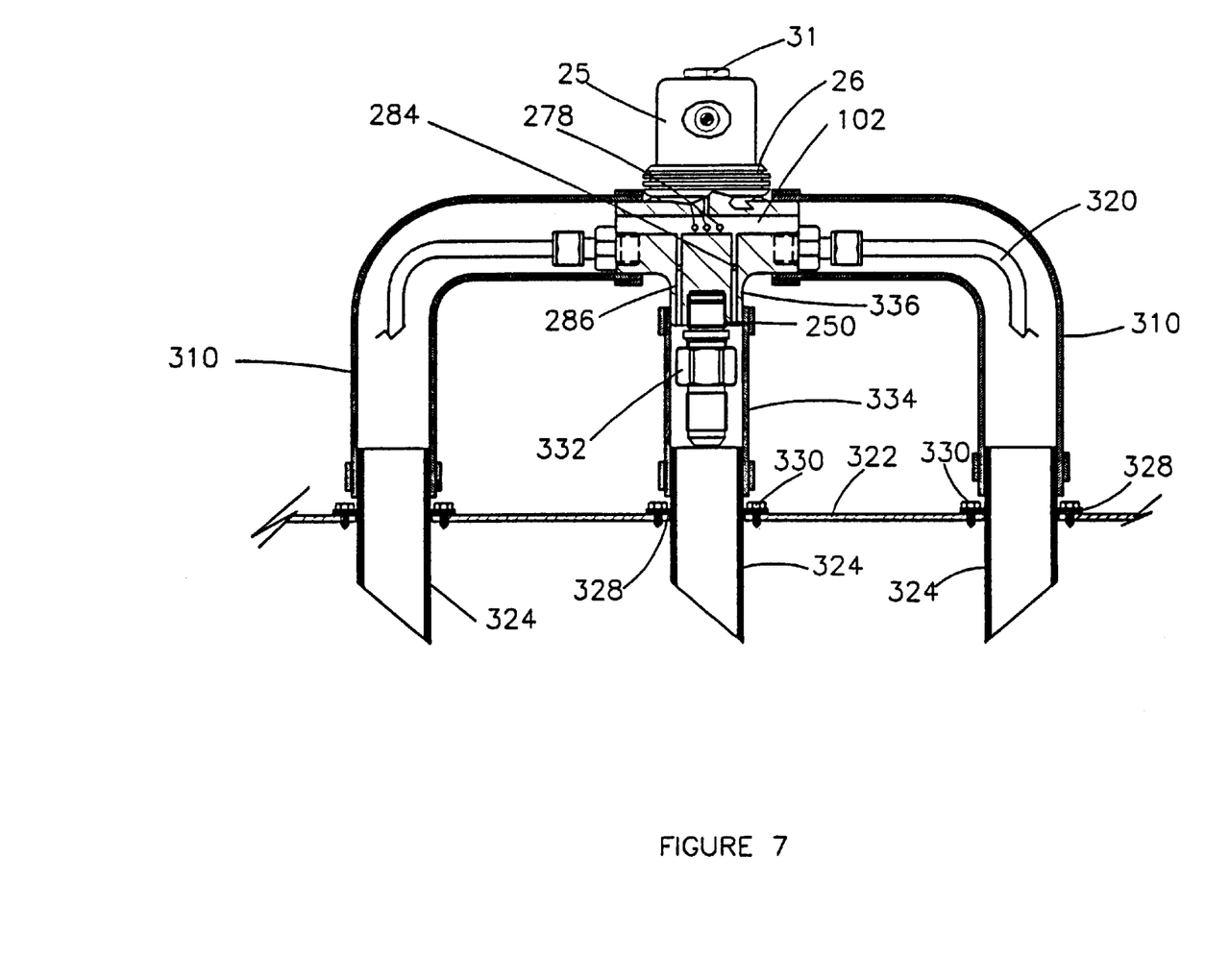
FIG. 7 is a partial sectional view of the valve connected into vent galleries (typical in both modes of connection)

A further aspect of the present invention can be seen, especially in FIGS. 4 and 7, where it is evident that there are provided two venting hoses 310, each having one end 312 secured to the valve body 6 by fitting over a respective boss 314 such that a gallery aperture 102 and a high pressure opening 318 (to which respective feed line 320 is attached) communicate only with the interior of the respective venting hose 310. As best seen in FIG. 7, the other end of each venting hose 310 is open to the atmosphere on the exterior of the vehicle. More particularly, the wall of the vehicle dividing the inside from the outside is shown at the numeral 322 in FIG. 7. Secured to the wall 322, and passing through it, are three vent flange adapters 324, of which the outer two are connected respectively with the downstream end of the appropriate venting hose 310. If desired, a circular clamp 326 (see FIG. 4) could be used to secure this connection. The function of the middle vent flange adapter 324 will be explained subsequently.

It will be noted particularly in FIG. 4 that the feed lines 320 remain inside their respective venting hose 310 to the downstream end, where the respective feed line exits. From the exit, the feed lines run to the engine of the vehicle. Thus, the feed lines 320 do not "break through" the wall of the respective venting hose 310, which means that there is no possibility of any leakage of gaseous fuel between the upstream connection of the venting hose to the respective boss 314 and the downstream connection of the venting hose to the flange adapter 324.

Each of the vent flange adapters 324 has an integral annular flange 328 and is secured in place by a plurality of threaded fasteners 330 of known kind, which engage the wall 322.

As best seen in FIG. 7, the bottom end of each vent flange adapter 324 is truncated along an angle of approximately 45°, whereby the angular orientation of the vent flange adapter 324 can be selected so as to maximize the suction on the downstream end of the venting hose 310 when the vehicle is moving.

Referring simultaneously to FIGS. 1, 4 and 7, either of two conventional pressure relief devices 332, 332a is adapted to be mounted in an opening 250 in the valve body 6, the opening 250 having an internal thread which engages an external thread on the pressure relief device 332. The opening 250 communicates along the passageway 252 with the interior of the inlet passageway 12. An O-ring (not shown) is provided for purposes of sealing. As will now be evident from an inspection of FIG. 7, the pressure relief device 332, 332a is located within a venting hose 334 which fits over a suitable boss 336 and which has a downstream end secured to the third vent flange adapter 324. It is not the purpose of the venting hose 334 to contain the high pressure gaseous fuel in the event that the pressure relief device 332, 332a is activated. The containment of such released fuel is the task of a high pressure line 338, 338a and the appropriate connecting means. The function of the venting hose 334 is to conduct to the exterior of the vehicle any gaseous fuel that leaks out along the threaded connection between the valve body 6 and the pressure relief device 332, 332a.

To provide further insurance against leakage into the interior of the vehicle in the event of a leak around the pressure relief device 332, 332a, there are provided two vent ducts 286 between the face of the boss 336 and the main vent gallery 102.

Figure 8:
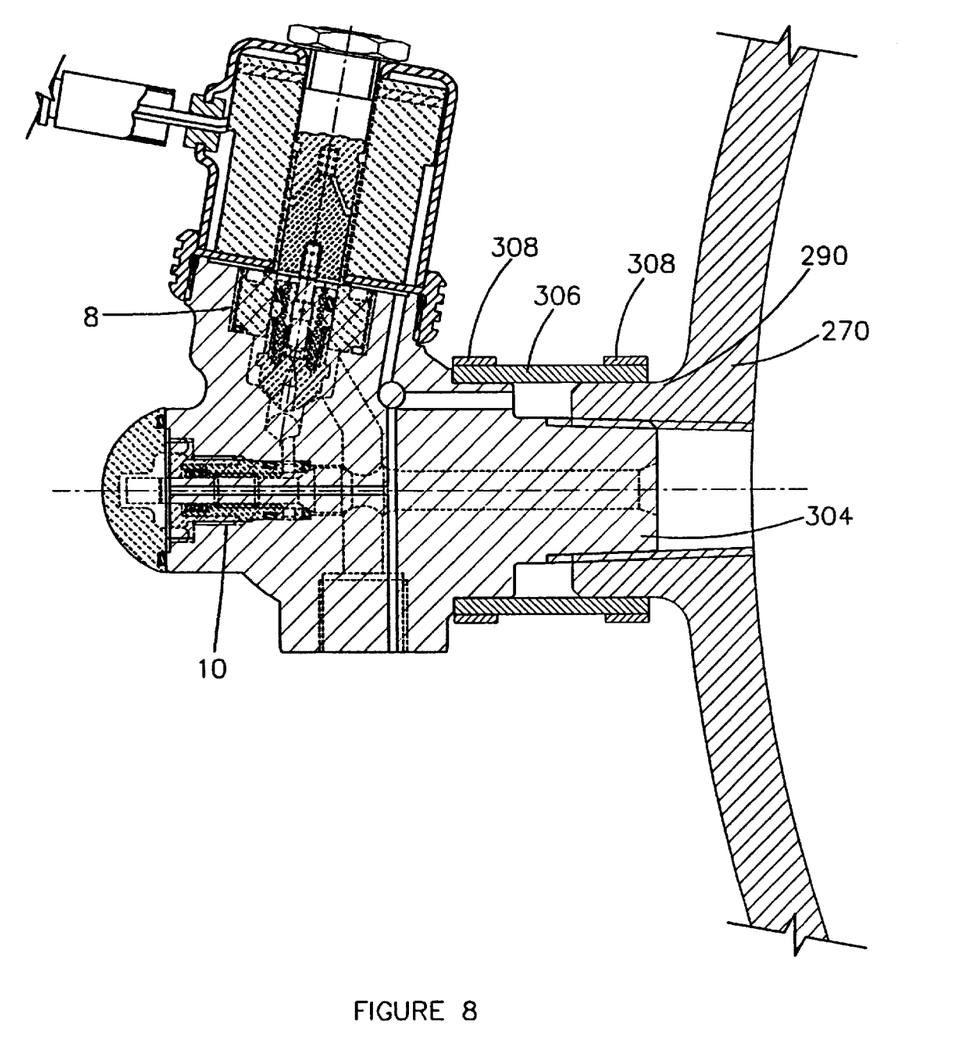
FIG. 8 is a partial sectional view of the valve body connected to the tank in accordance with FIG. 5.
Figure 9:
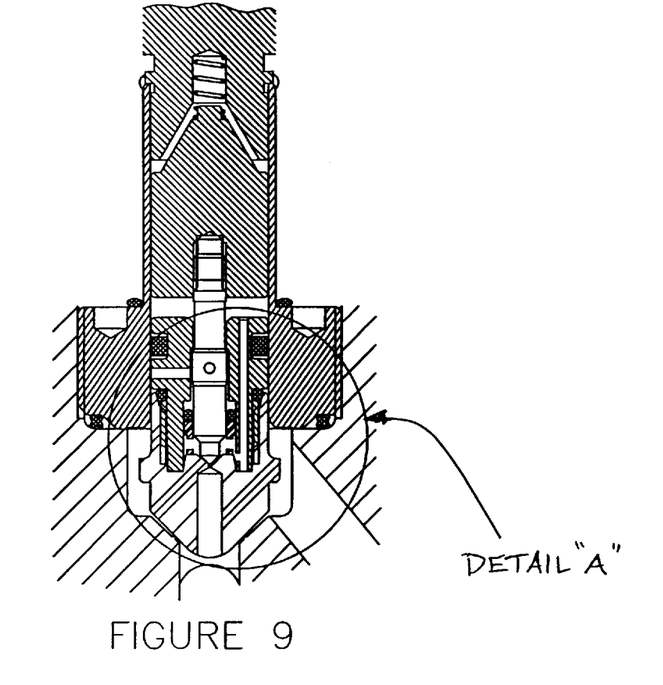
FIG. 9 is a partial sectional side view of an instant-on valve of the present invention.
Figure 10:
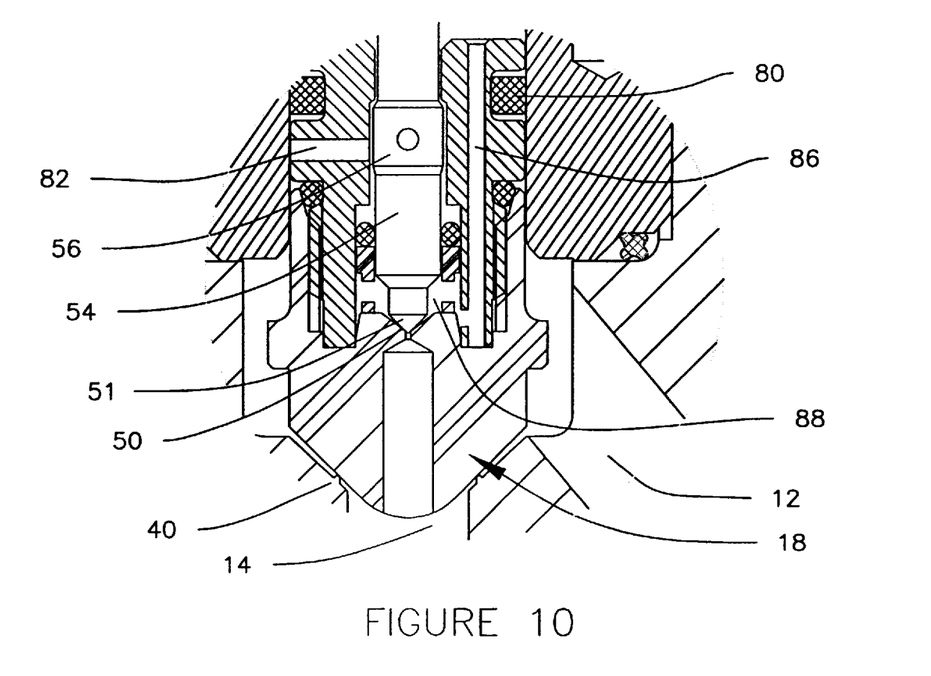
FIG. 10 is an exploded view of Detail A of FIG. 9.

FIG. 8 is a partial sectional side view of an instant-on valve with manual override installed in a tank in accordance with FIG. 5 with a sleeve 306 and clamps 308 surrounding the connection between the boss 304 and the neck of the tank 290. The same reference numerals have been used in FIG. 8 as used in FIGS. 1 to 7 to describe the same components.

While one embodiment of this invention has been illustrated in the accompanying drawings and described hereinabove, it will be evident to those skilled in the art that changes and modifications may be made therein, without departing from the essence of this invention.

I claim:

1. A tank valve assembly with manual override for connection to a tank containing high pressure gaseous fuel, said valve assembly and manual override comprising in combination:

(a) an inlet passageway and an outlet passageway;

(b) in said valve assembly, a bleed valve and a main valve, said main valve having a secondary piston mounted to open and close a main orifice, said bleed valve having a bleed valve stem mounted to move relative to said secondary piston to open and close a bleed orifice, said main orifice and said bleed orifice providing access to said outlet passageway, an outer portion of said secondary piston being mounted in a zone that has an open access to said tank through said inlet passageway when both of said valves are closed so that said zone has a pressure substantially equal to a pressure of said high pressure gaseous fuel within said tank, said zone being isolated from said access to said tank when said bleed valve opens by a sufficient amount, said zone having a drain to drain pressure from said zone when said zone is isolated from said access, said secondary piston having an inner portion that is mounted in a chamber, said chamber being accessible to said high pressure gaseous fluid in said tank, said main valve opening when said pressure on said inner portion from said chamber is sufficiently greater than a pressure on said outer portion from said zone, said bleed valve being connected to open when a solenoid is activated, said main valve closing when said solenoid is deactivated, said secondary piston being biased towards a closed position by a force external to said secondary piston, said zone having said open access to said gaseous fuel within said tank when said bleed valve is closed, said main valve closing when said pressure in said zone on said outer portion is sufficiently greater than a pressure on said inner portion;

(c) said manual override being connected to alternately close off said tank or vent said tank if said instant-on valve assembly is not operating properly, wherein the manual override has an elongated spindle with a head at an outer end thereof, said valve spindle having annular projections thereon, said annular projections being sized to fit within a corresponding screw thread in a housing surrounding said spindle so that said spindle will move inward when turned in one direction and outward when turned in an opposite direction, said manual override having a fully open position when said spindle is turned outward to allow gaseous fuel to flow to said valve assembly, said manual override having a fully closed position when said spindle is turned fully into an inlet passageway to said valve assembly to close said passageway, said manual override having a bypass position to permit gaseous fuel to flow from said tank directly into said outlet passageway, thereby bypassing said valve assembly.

2. A combination valve means with manual override, said valve means having:

an inlet; and an outlet, said manual override having an open position and a shut-off position, said valve means outlet being disposed in fluid communication with a tank containing high pressure gaseous fuel upon said manual override having assumed said open position, wherein said manual override prevents fluid communication between said valve means outlet and said tank upon said manual override having assumed said shut-off position, wherein said manual override further comprises:

(a) an elongated valve spindle having annular projections extending therefrom; and (b) a housing having an internal bore with a sidewall, said sidewall defining a screw thread, said spindle disposed within said bore and said annular projections fitted within said screw thread, such that said manual override is capable of assuming said open and shut-off positions by travel of said annular projections and said spindle along said screw thread, wherein said open position of said manual override includes a fully open position and a bypass position, said manual override permitting flow of said fuel from said tank to said outlet while bypassing said valve means upon said manual override having assumed said bypass position, said manual override preventing flow of said fuel from said tank to said outlet from bypassing said valve means upon said manual override having assumed said fully open position, said manual override capable of assuming said fully open and bypass positions by travel of said annular projections and said spindle along said screw thread.

3. The combination valve means as claimed in claim 2, wherein said valve means inlet comprises a first valve seat;

said housing further comprising:

a bypass passageway connecting said internal bore with said valve means outlet; and a second valve seat disposed between said bypass passageway and said valve means inlet;

and wherein said elongated valve spindle further comprises:

a first valve having a first position and a second position, wherein said first valve is seated in said first valve seat upon said first valve assuming said first position and simultaneously with said manual override having assumed said shut-off position, and wherein said first valve is removed from said first valve seat when in said second position and simultaneously with said manual override having assumed either of said fully open or bypass positions; and a second valve having a first position and a second position, wherein said second valve is seated in said second valve seat upon said second valve assuming said first position and simultaneously with said manual override having assumed said fully open position, and wherein said second valve is removed from said second valve seat upon said second valve assuming said second position and simultaneously with said manual override having assumed either of said shut-off or bypass positions.

4. The combination valve means as claimed in claim 3, wherein said valve means inlet defines a primary passageway which permits fluid communication between said tank and said valve means, and includes a throughbore for receiving said elongated valve spindle;

and wherein said elongated valve spindle has a first position and a second position, said spindle protruding into said primary passageway through said throughbore and impeding flow and fuel through said primary passageway when said spindle is in said first position, said spindle being substantially removed from said primary passageway when said spindle is in said second position and thereby minimally impeding any flow through said primary passageway, said second valve simultaneously assuming said second valve first position upon said spindle having assumed said second spindle position.

5. A combination valve means and manual override, said valve means including an inlet and an outlet, said manual override affecting flow of high pressure gaseous fuel from a tank to said inlet, said manual override comprising:

a manually-actuated valve;

a manual actuator for causing movement of said manually-actuated valve by application of a manual force; and a mechanical advantage means for multiplying said manual force applied to said actuator to assist in overcoming internal gaseous pressures which tend to impede movement of said manually-actuated valve, wherein said manual actuator has a bypass position and a fully open position, said manual override permitting said flow of said high pressure gaseous fuel to said valve means outlet while bypassing said valve means upon said manual override having assumed said bypass position, said manual override preventing any flow of said fuel from said tank to said outlet from bypassing said valve means upon said manual override having assumed said fully open position, said manual actuator causing said manual override to assume either of said bypass position and said fully open position by said application of said manual force.

6. The combination valve means as claimed in claim 5 wherein said mechanical advantage means comprises:

(a) an elongated valve spindle, coupled to said manual actuator, having annular projections extending therefrom; and (b) a housing having an internal bore with a sidewall, said sidewall defining a screw thread, said spindle disposed within said bore and said annular projections fitted within said screw thread, such that said manual override is capable of assuming said bypass and fully open positions by travel of said annular projections and said spindle along said screw thread.

7. The combination valve means as claimed in claim 6, wherein said housing further comprises:

a bypass passageway connecting said internal bore with said valve means outlet; and a valve seat disposed between said bypass passageway and set valve means inlet;

and wherein said elongated valve spindle further comprises:

a valve, wherein said valve is seated in said valve seat upon said manual override assuming said fully open position, and wherein said valve is removed from said valve seat upon said manual override assuming said bypass position.

* * * * *